US012065949B2

(12) United States Patent
Ozbaysal et al.

(10) Patent No.: US 12,065,949 B2
(45) Date of Patent: Aug. 20, 2024

(54) SYSTEM AND METHOD FOR REPAIRING HIGH-TEMPERATURE GAS TURBINE COMPONENTS

(71) Applicant: SIEMENS ENERGY, INC., Orlando, FL (US)

(72) Inventors: Kazim Ozbaysal, Charlotte, NC (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 18/233,591

(22) Filed: Aug. 14, 2023

(65) Prior Publication Data
US 2023/0383659 A1 Nov. 30, 2023

Related U.S. Application Data

(63) Continuation of application No. 17/577,607, filed on Jan. 18, 2022, now Pat. No. 11,795,832, which is a continuation-in-part of application No. PCT/US2019/061182, filed on Nov. 13, 2019, and a continuation-in-part of application No. PCT/US2019/061204, filed on Nov. 13, 2019.

(60) Provisional application No. 63/229,753, filed on Aug. 5, 2021, provisional application No. 63/142,540, filed on Jan. 28, 2021.

(51) Int. Cl.
F01D 9/02 (2006.01)
B23P 6/00 (2006.01)

(52) U.S. Cl.
CPC .............. *F01D 9/02* (2013.01); *B23P 6/002* (2013.01); *F05D 2220/32* (2013.01); *F05D 2230/80* (2013.01)

(58) Field of Classification Search
CPC .............. B23P 6/005; Y10T 29/49318; Y10T 29/49737; Y10T 29/49734; Y10T 29/49732
See application file for complete search history.

(56) References Cited

U.S. PATENT DOCUMENTS

| | | | | |
|---|---|---|---|---|
| 7,343,676 | B2* | 3/2008 | Ng | B23K 35/0244 29/402.09 |
| 9,416,667 | B2* | 8/2016 | Cui | F01D 5/005 |
| 11,203,064 | B2* | 12/2021 | Ozbaysal | B22F 5/04 |
| 2015/0224607 | A1* | 8/2015 | Bruck | B23K 35/36 228/56.3 |
| 2018/0345396 | A1* | 12/2018 | Kottilingam | F01D 5/005 |

* cited by examiner

Primary Examiner — Jason L Vaughan

(57) ABSTRACT

A replacement assembly for replacing a damaged portion of a component includes a replacement piece including a first plurality of layers with each layer of the first plurality of layers formed on top of a prior formed layer of the first plurality of layers, the first plurality of layers arranged to define a curved leading-edge portion and a first interface surface, the first interface surface defined by a first continuous curve. An attachment piece includes a second plurality of layers with each layer of the second plurality of layers formed on top of a prior formed layer of the second plurality of layers, the attachment piece arranged to fit between the first interface surface and the component to fixedly attach the replacement piece to the component to replace the damaged portion of a component.

15 Claims, 14 Drawing Sheets

SYSTEM AND METHOD FOR REPAIRING HIGH-TEMPERATURE GAS TURBINE COMPONENTS

TECHNICAL FIELD

The present disclosure is directed, in general, to a system and method for repairing high-temperature gas turbine components, and more specifically to such a system and method for the repair of gas turbine blades and vanes.

BACKGROUND

The difficulties associated with the additive manufacture (AM) of nickel-base gas turbine components with high gamma prime content makes the process unsuitable for large scale manufacturing or repair. In particular, attempts to additively manufacture components using Alloy (CM) 247, or to repair such components often result in grain boundary melting and cracking. Alternatively, the components are repaired with another inferior nickel base alloy that is less prone to cracking, resulting in poor performance of the component.

SUMMARY

A method of forming a component includes mixing a powdered base material and a binder to define a mixture, forming the mixture into a desired shape without melting the base material, removing the binder from the desired shape to define a skeleton, the volume of the skeleton being between 80 percent and 95 percent base material, and infiltrating the skeleton with a melting point depressant material to define a finished component, the finished component having less than 1 percent porosity by volume.

In another construction, a component includes a skeleton formed from a base material and defining the final shape of the component, the skeleton having a porosity between 5 percent and 20 percent, and a melting point depressant material disposed within the skeleton, the melting point depressant material filling the pores within the skeleton to define a finished component having less than 1 percent porosity by volume.

In another arrangement, a method of repairing a component includes removing a damaged portion from the component to leave a first interface surface that is defined by a continuous curve, mixing a powdered base material and a binder to define a mixture, and printing the mixture into a desired shape without melting the base material. The method also includes removing the binder from the desired shape, solid-state sintering the desired shape to form a replacement piece having a second interface surface that is defined by the continuous curve, and attaching the second interface surface to the first interface surface to replace the damaged portion of the component.

In another construction, a method of repairing a component includes removing a damaged portion from the component to leave a first interface surface, mixing a powdered base material and a binder to define a mixture, and micro-injecting a layer of the mixture having a thickness between 10 microns and 100 microns. The method also includes repeating the micro-injecting process to form additional layers and complete a replacement piece, heating the replacement piece to remove the binder, sintering the replacement piece, and fixedly attaching the replacement piece to the component to replace the damaged portion.

In another construction, a replacement assembly for replacing a damaged portion of a component includes a replacement piece including a first plurality of layers with each layer of the first plurality of layers formed on top of a prior formed layer of the first plurality of layers, the first plurality of layers arranged to define a curved leading-edge portion and a first interface surface, the interface surface defined by a first continuous curve. An attachment piece includes a second plurality of layers with each layer of the second plurality of layers formed on top of a prior formed layer of the second plurality of layers, the attachment piece arranged to fit between the first interface surface and the component to fixedly attach the replacement piece to the component to replace the damaged portion.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this specification and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Figure 1:
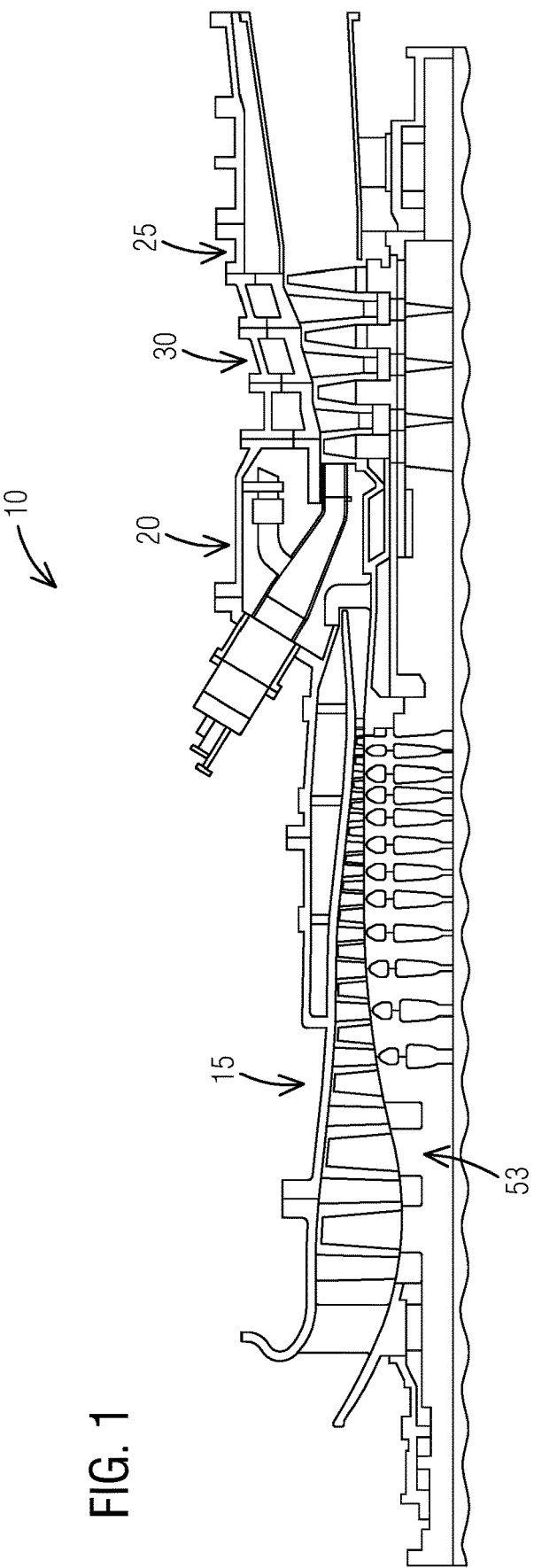
FIG. 1 is a longitudinal section view of a gas turbine engine.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise.

Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard as available a variation of 20 percent would fall within the meaning of these terms unless otherwise stated.

FIG. 1 illustrates a gas turbine or combustion turbine engine 10 that includes a compressor section 15, a combustion section 20, and a turbine section 25. During operation, atmospheric air is drawn into the compressor section 15 and compressed. A portion of the compressed air is mixed with a fuel and combusted in the combustion section 20 to produce high-temperature products of combustion. The products of combustion are mixed with the remaining compressed air to form exhaust gas that then passes through the turbine section 25. The exhaust gas expands within the turbine section 25 to produce torque that powers the compressor section 15 and any auxiliary equipment attached to the engine 10, such as an electrical generator. The exhaust gas enters the turbine section 25 at a high temperature (1000 degrees F., 538 degrees C. or greater), such that the turbine blades 30 and vanes are exposed to high temperatures and must be manufactured from materials suited to those temperatures. The terms "blade" and "vane" should be read as being interchangeable. While typically, the term "blade" refers to rotating air foils and "vane" refers to stationary airfoils, the invention should not be limited to these definitions as most repairs or processes are equally applicable to both blades and vanes.

Figure 2:
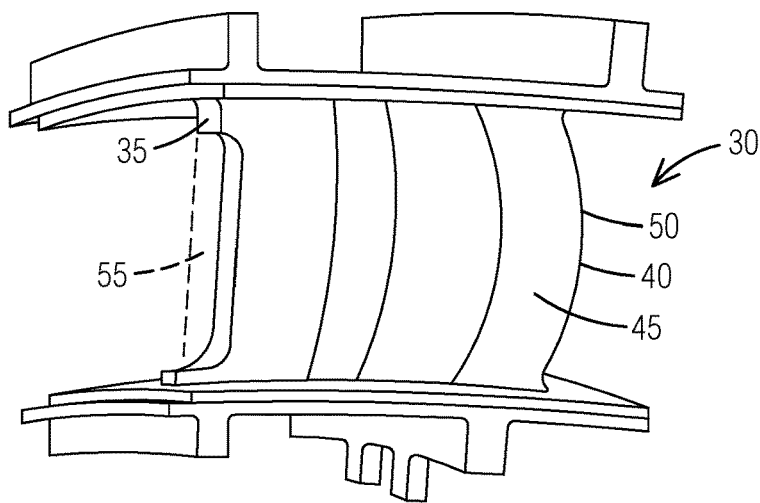
FIG. 2 is a perspective view of several vanes of the gas turbine engine of FIG. 1.

In one construction, the vanes 30 are manufactured from a nickel-based superalloy such as Alloy (CM) 247. FIG. 2 illustrates a portion of the stationary vanes 30 from the turbine section 25 of the engine 10 of FIG. 1. Each vane 30 includes a leading edge 35, a trailing edge 40, a suction side 45, and a pressure side 50. Adjacent vanes 30 cooperate with one another to define a flow path therebetween. The exhaust gas passes through the flow paths and is directed and accelerated as desired to provide an efficient expansion of the exhaust gas and to provide torque to a rotor 53 that in turn drives the auxiliary equipment.

During operation, the vanes 30 can become damaged. Damage can be caused by foreign object impacts, high temperature operation, fatigue, creep, oxidation, and the like. One area that is susceptible to damage is the leading edge 35 of the vane 30. FIG. 2 illustrates one of the vanes 30 with a portion 55 of the leading edge 35 removed. A desired repair would include replacing the removed portion 55 with a material that closely matches the base material. However, nickel-based superalloys such as those used to manufacture the vanes 30 are not conducive to welding or typical additive manufacturing repair processes.

Figure 3:
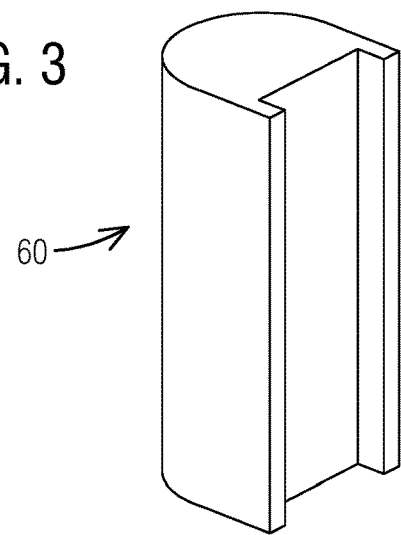
FIG. 3 is a perspective view an insert piece for use in repairing a turbine vane of FIG. 2.
Figure 4:
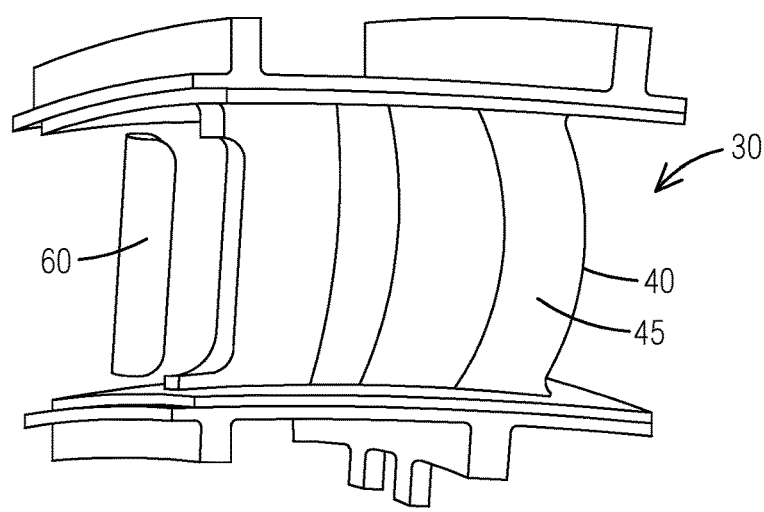
FIG. 4 is a perspective view of the vanes of FIG. 2 with the insert piece of FIG. 3 being installed.

FIG. 3 and FIG. 4 illustrate one possible repair for the leading edge 35 of the vane 30 illustrated in FIG. 2. FIG. 3 illustrates an insert piece in the form of a leading edge insert 60 and FIG. 4 illustrates the positioning of the leading edge insert 60 in the vane 30 for attachment. The insert 60 includes a substantial portion of matching base material and is typically attached using a brazing process.

FIG. 5 to FIG. 12 illustrate a process for manufacturing the insert piece 60 illustrated in FIG. 3 or any other repair component desired. FIG. 5 to FIG. 8 illustrate the process for a generic cube-shaped object 65 while FIG. 9 to FIG. 12 illustrate a similar process for the leading edge insert 60 illustrated in FIG. 3.

Figure 5:
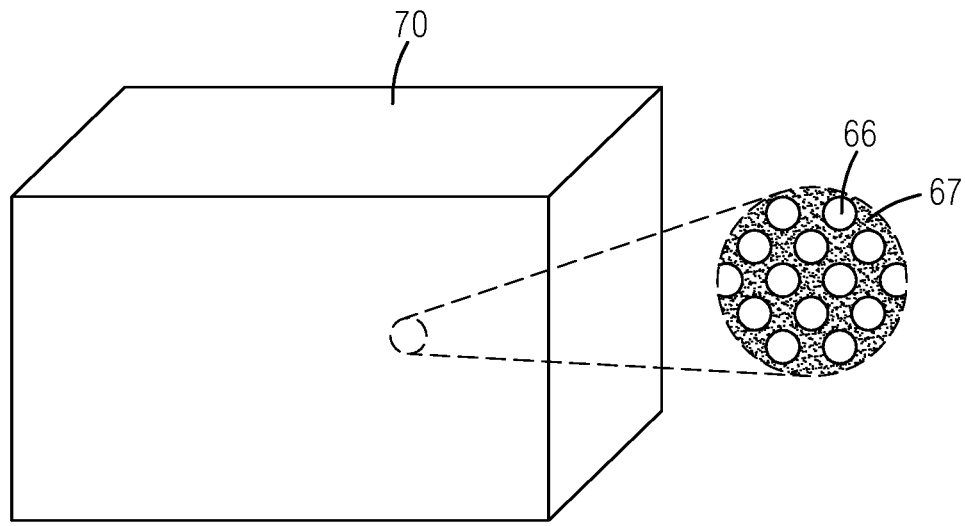
FIG. 5 is a perspective view of a component 3D printed to a near net shape.
Figure 9:
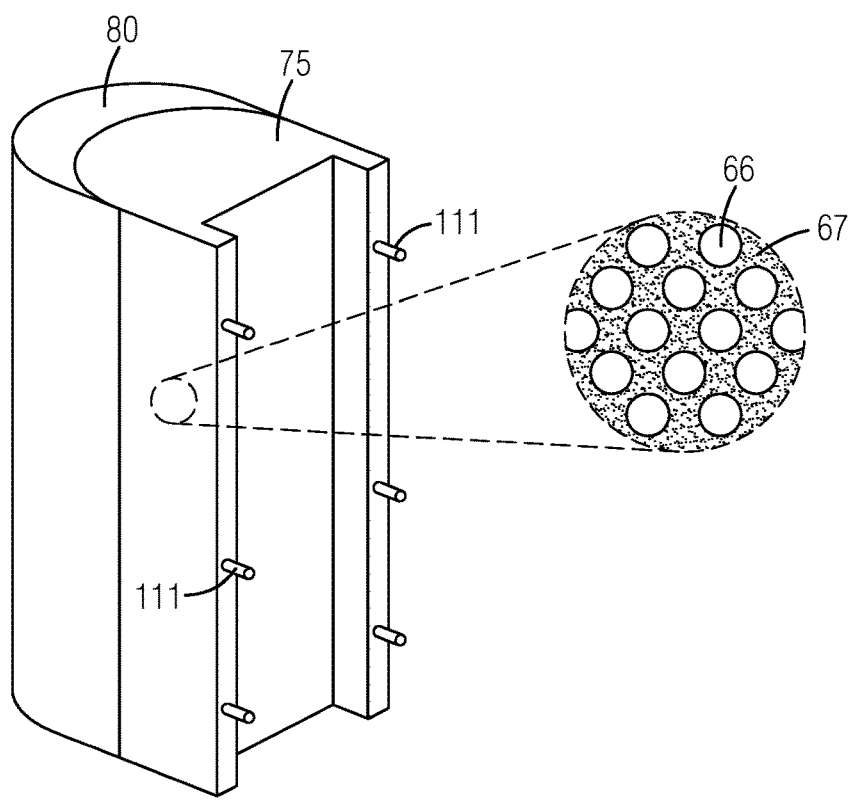
FIG. 9 is a perspective view of another component 3D printed to a near net shape.

The process begins by mixing a high gamma prime nickel powder 66 (base material) with a binder 67 and 3D printing or otherwise additively manufacturing a green form of the desired component 70, 75 to a near net shape. The green form component 70, 75 is then allowed to dry. FIG. 5 and FIG. 9 illustrate this step. During the printing or additive manufacturing process, the base material is not melted. As used herein, the term "near net shape" means that the component falls within the desired manufacturing parameters and tolerances for the component at a particular step in the manufacturing process without further machining. However, some surface grinding or polishing may be required to achieve a desired surface finish or texture for the final component. In addition, additional layers or coatings may be applied to the component to complete the component for use. Furthermore, and as illustrated in FIG. 9 to FIG. 12 the green form component 75 may include features such as gates 80, or support structures that are used during the manufacturing process and then removed. The green form component 75, including features such as these would be considered near net shape as additional machining or processing is not required before the additional manufacturing steps are performed and all that is required is the removal of the unwanted features (gate 80).

Figure 6:
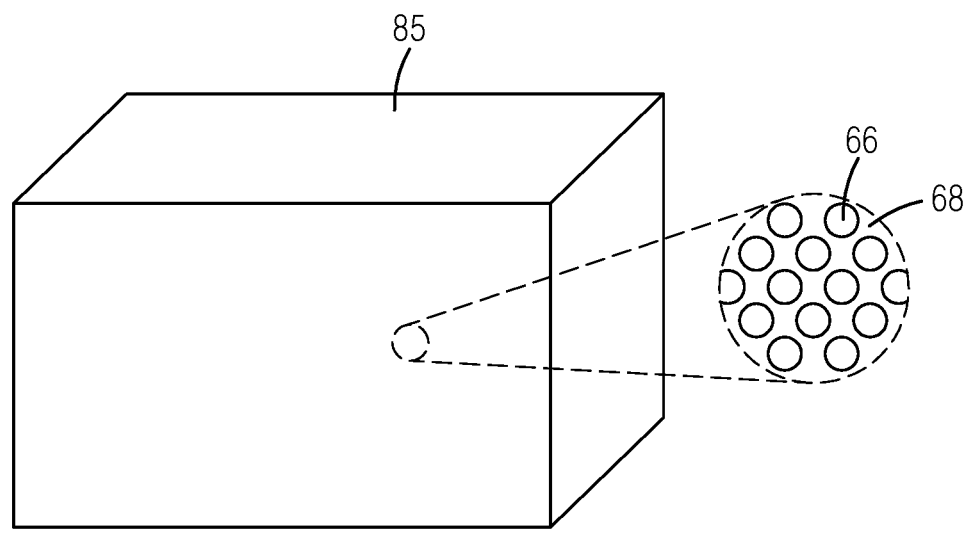
FIG. 6 is a perspective view of the component skeleton after removal of a binder and sintering.
Figure 10:
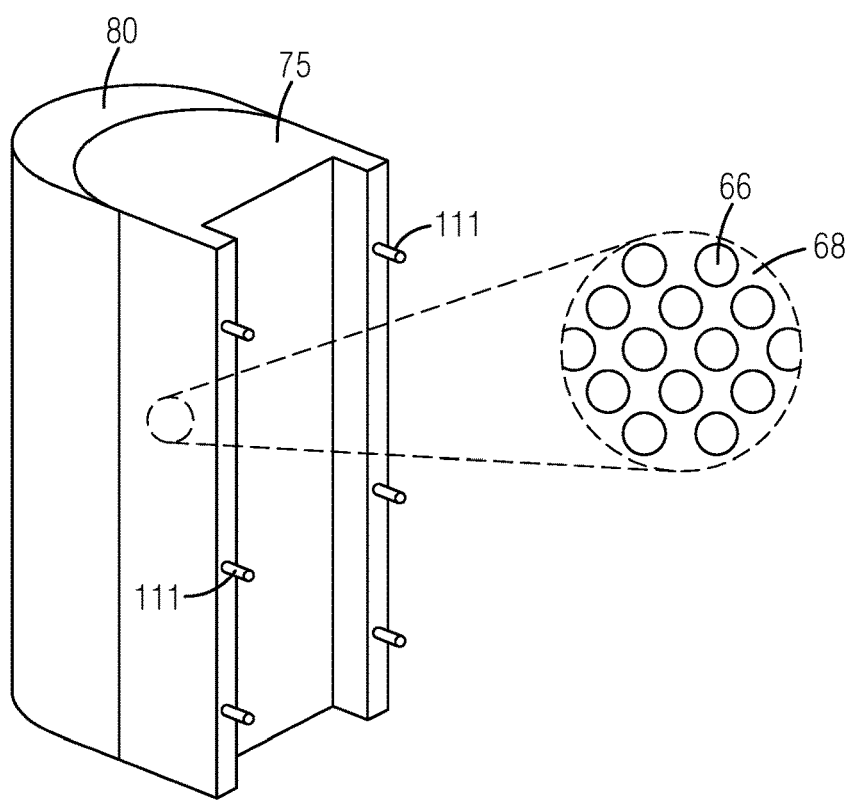
FIG. 10 is a perspective view of the component skeleton of FIG. 9 after removal of a binder and sintering.

The next step is the placement of the green form component 70, 75 into a furnace or other heating device. The green form component 70, 75 is heated to burn or remove the binder 67. The remaining material defines a skeleton 85, 90 made up of the base material 66 and gaps or empty areas 68 formerly occupied by the binder material 67. In FIG. 6, the skeleton 85 is a cube-shape. In FIG. 10 the skeleton 90 defines an intermediate component that will ultimately become the leading edge insert 60 and further includes the gate 80. In preferred arrangements, the heating or sintering step does not melt the base material 66 and leaves at least eighty percent of the volume of the skeleton 85, 90 as base material 66, thereby leaving no more than twenty percent of the skeleton 85, 90 as empty space 68. This is referred to herein as twenty percent porosity or less. The amount of binder 67 used, and the sintering temperature are selected to arrive at less than twenty percent porosity and preferably between five percent and twenty percent porosity.

Figure 7:
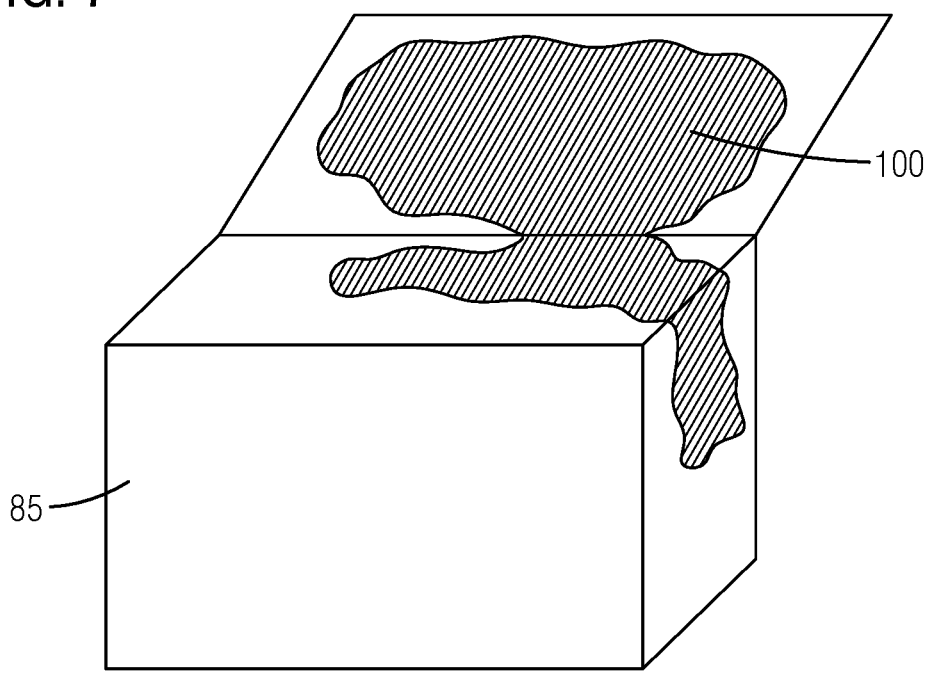
FIG. 7 is a perspective view of the component skeleton during an infiltration of a melting point depressant.
Figure 8:
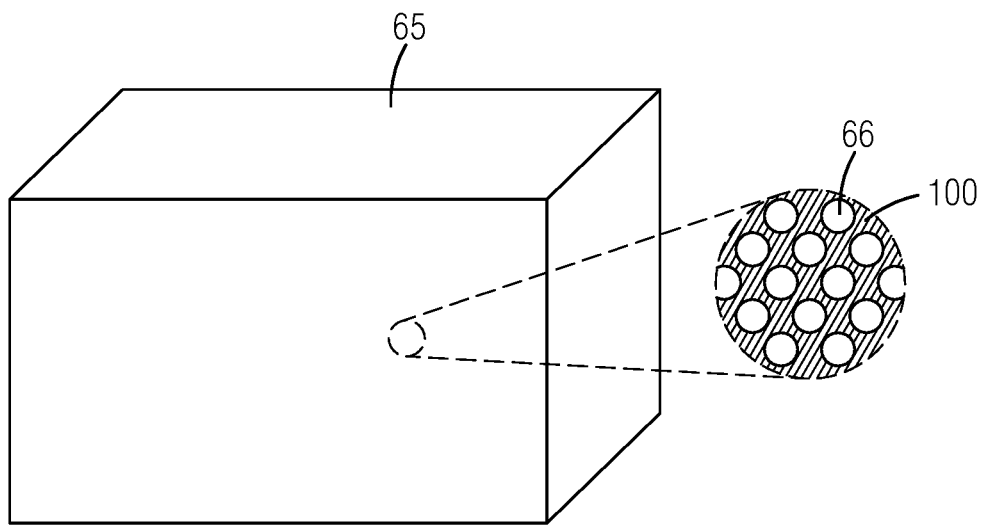
FIG. 8 is a perspective view of the completed near net shape component following infiltration.
Figure 11:
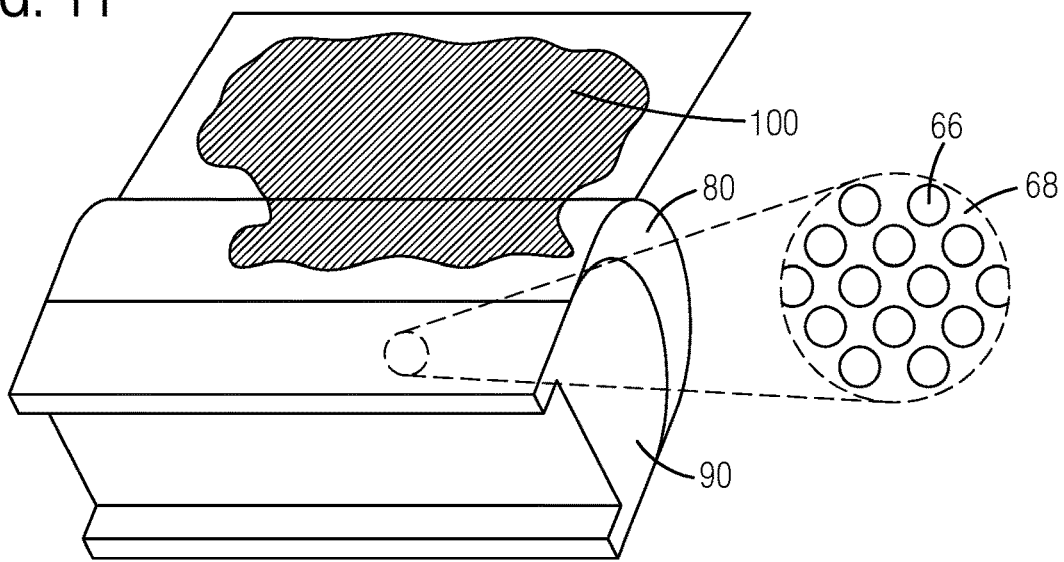
FIG. 11 is a perspective view of the component skeleton of FIG. 9 during an infiltration of a melting point depressant.
Figure 12:
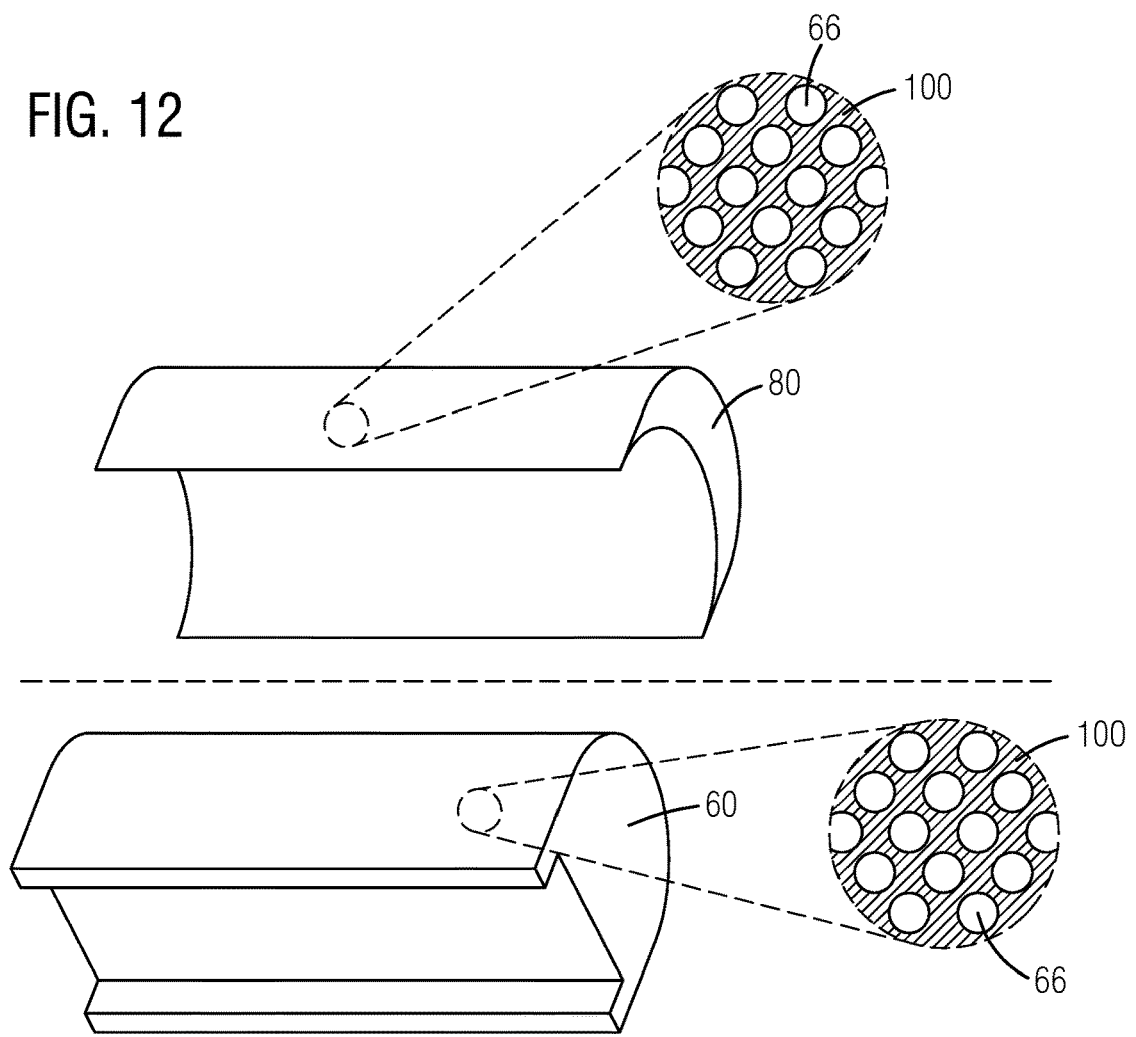
FIG. 12 is a perspective view of the completed near net shape component following infiltration and during removal of a gate.

As illustrated in FIG. 7 and FIG. 11, the skeleton 85, 90 and the gate 80 are infiltrated with low melting point material, or melting point depressant 100 (sometimes referred to as braze material). Preferred compositions of the melting point depressant 100 include at least one of titanium (Ti), zirconium (Zr), and hafnium (Hf) with the balance being chromium (Cr) and nickel (Ni). The use of boron (B), silicon (Si), or phosphorous (P) in part or in whole as the melting point depressant 100 is avoided to prevent the negative effects these materials have on the material properties of the completed component 60, 65.

To produce the desired infiltration, the melting point depressant 100 is melted in a manner that assures that the liquid melting point depressant 100 is in contact with the skeleton 85, 90. Capillary action produced by the porosity in the skeleton 85, 90 pulls the liquid melting point depressant 100 into the pores 68 of the skeleton 85, 90 and can result in a completed component 60, 65 that is ninety-nine percent filled with material (i.e., one percent porosity).

The specific composition of the melting point depressant 100 is selected based at least in part on the quantity of titanium included in the base material. For example, in constructions that include 3.5 percent or more titanium by weight in the base material, the desired melting point depressant 100 includes at least one of Hf and Zr with the remainder being Ni and Cr. In constructions with 1.0 percent or less Ti in the base material, the preferred composition includes Ti with the balance being Ni and Cr. When the quantity of Ti is between 1.0 percent and 3.5 percent in the base material, the desired composition includes at least one of Zr, and Ti with the balance being Ni and Cr. The quantity of Ti, Zr, or Hf are selected such that the completed nickel-based component has less than 6.0 percent Ti (with other constructions being below 5.0 percent and still others below 4.0 percent).

Once the infiltration is complete, any features added for manufacturing requirements such as the gate 80 or a support structure illustrated in FIG. 9 to FIG. 12 are removed to complete the component 60, 65. Any additional grinding, polishing, or layer additions can now be performed prior to the installation of the component 60, 65 as illustrated in FIG. 4. In preferred constructions, following infiltration, the component 60, 65 has less than one percent porosity.

The process described herein does not melt the base material powder 66. Rather, the powder 66 is mixed with the binder 67, 3D printed using a laser source or other energy source and dried. The binder 67 is burned out at low temperature (e.g., <500C). The remaining base material 66 is heated up to a sintering temperature that assures a maximum of twenty percent porosity is left in the sintered material.

For nickel-based alloys, the amount of titanium employed is preferably limited to around six percent (i.e., between four and eight percent) to reduce the likelihood of reduced mechanical properties. Due to this limitation, the level of porosity in the skeleton 85, 90 is determined, at least in part by the amount of titanium in the base material and in the braze material 100 (sometimes referred to as melting point depressant) with the goal being about six percent titanium in the finished component 60, 65. For example, in one construction, the base material or the skeleton 85, 90 may include no titanium. If a braze material that contains 22% titanium is employed, the total porosity of the skeleton 85, 90 would be limited to about 30% which leads to a completed component 60, 65 with about 6.6% titanium.

In another example, the skeleton 85, 90 includes 1% titanium. In this case, using the same braze material with 22% titanium, the skeleton 85, 90 should be limited to less than 20% porosity to arrive at a finished component 60, 65 having about 5.2% titanium.

In yet another example, the skeleton 85, 90 includes 2% titanium. In this case, using the same braze material with 22% titanium the skeleton 85, 90 should be limited to less than 15% porosity to arrive at a finished component 60, 65 having about 6.0% titanium.

As discussed, nickel-based gas turbine components, specifically Alloy (CM) 247 components, are difficult to repair or build-up with any method that involves melting of the component since the grain boundary melting (incipient melting) temperature is low with respect to the welding temperature such that the weld repair often generates cracks during the repair process.

As discussed with regard to FIG. 2 to FIG. 12, one alternative to weld repair is to first build a replacement component 60, 65 (a pre-sintered preform (PSP)) for the damaged section of the vane 30 and then join this new replacement component 60, 65 to the component being repaired (e.g., vane 30) using a process that assures a maximum temperature that remains below the grain boundary melting temperature. To further improve this repair, one could replace the damaged section of the component being repaired with a replacement component 60, 65 that includes a functional material that provides a higher oxidation resistance than the base material of the component being repaired (e.g., vane 30).

The damaged portion 55 is removed and replaced with a close-fitting replacement component 105 made using additively manufactured (AM) material or a pre-sintered preform (PSP) that provides similar or better oxidation and rupture properties. When the replacement component 105 is a replacement for the leading edge 35 as illustrated in FIG. 2 to FIG. 4 and FIG. 9 to FIG. 12, additively manufactured replacement components 105 can include columnar grains with significant rupture capability.

To perform a repair of the leading edge 35 with a high oxidation resistant material, the damaged portion 55 of the leading edge 35 of the vane 30 is first removed. The removed damaged portion 55 is measured to determine the size and configuration of the replacement component 105 that will be installed. The replacement component 105 is then manufactured using an additive manufacturing process or as a PSP, such as a PSP made using a process as described with regard to FIG. 2 to FIG. 12. To enhance the oxidation resistance of the replacement component 105, the material used to manufacture it, when using an additive manufacturing process includes up to eight percent (8%) aluminum. In addition, attachment structures 110 such as pins, protrusions, notches, apertures, etc. can be formed as part of the replacement component 105 to enhance or create an interlock between the replacement component 105 and the vane 30 or other component being repaired.

When the replacement component 105 is manufactured as a PSP the preferred material includes up to eighty percent (80%) superalloy (preferably matching the vane 30 being repaired), up to eight percent (8%) aluminum, and up to thirty percent (30%) braze material including Ti, Zr, and Hf as described above. As with the additively manufactured replacement component 105, the PSP replacement components 105 can include attachment structures 110 like those described above. FIG. 9 and FIG. 10 illustrate attachment structures 110 in the form of alignment pins 111. The pins 111 align with and engage apertures formed in the blade 30 to which the replacement component 105 will attach. While the pins 111 are illustrated in only FIG. 9 and FIG. 10 for clarity, in preferred constructions the pins 111 would be formed as part of the replacement component 105 and would therefore be present at each step of the manufacturing process. In other constructions, the pins 111 are separate components that are attached to the replacement component 105 at some point during its manufacture. Attachment could be facilitated using any suitable attachment means including but not limited to adhesives, welding, brazing, etc.

The material used to manufacture the PSP replacement component 105 is maintained at a temperature at least 50 degrees C. above the braze melting temperature for more than one hour to react a majority of the braze material with the base material powder. This prevents re-melting during the braze operation that attaches the replacement component 105 to the vane 30.

Figure 13:
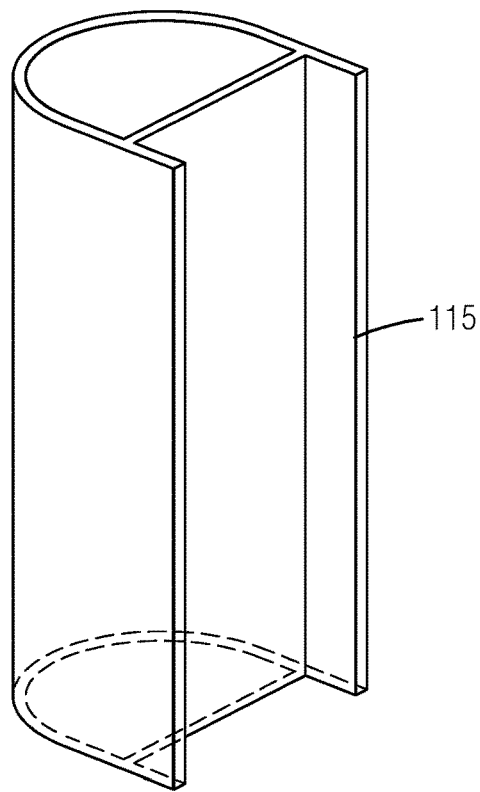
FIG. 13 is a perspective view of an attachment PSP for use in a leading-edge repair process.
Figure 14:
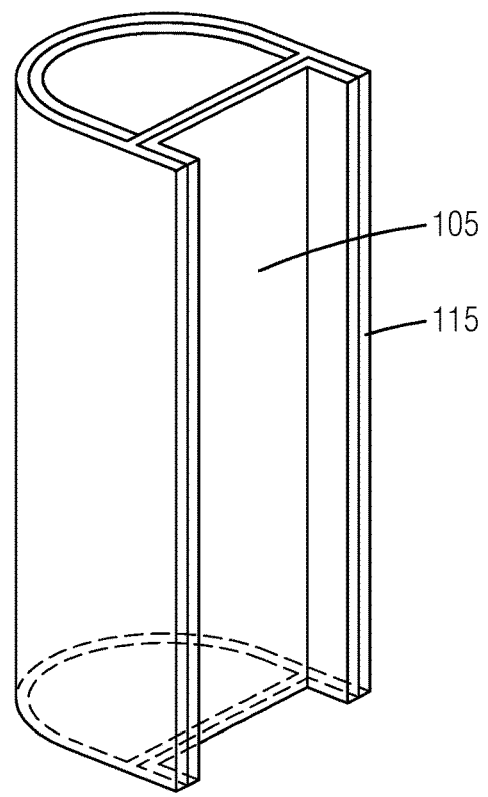
FIG. 14 is a perspective view of a leading-edge replacement component attached to the attachment PSP of FIG. 13.

An attachment PSP 115, shown in FIG. 13 is formed from a material combination similar to that described above with regard to the PSP replacement component 105 with the exception that it includes at least thirty percent (30%) braze material rather than up to thirty percent (30%) braze material. The attachment PSP 115 is preferably no more than 250 microns thick and is produced at a similar temperature as the PSP replacement component 105 described above but is held at that temperature for a shorter time (less than 15 minutes). The attachment PSP 115, therefore has enough unreacted braze material to be able to join the replacement component 105 as illustrated in FIG. 14, regardless of how it is manufactured (PSP or additive manufacturing) to the vane 30 being repaired.

The replacement component 105 has sufficient mechanical properties and oxidation resistance due to the adjusted composition and the Ni—Cr—(Ti, Zr, Hf) braze composition. In addition, when using the additively manufactured replacement component 105, the columnar grains provide significant rupture capability over the base material of equiaxed grain structure.

It should be noted that the replacement component 105 can be manufactured in a number of different shapes and sizes and should therefore not be limited to the arrangement illustrated in FIG. 2 to FIG. 4 and FIG. 9 to FIG. 14. For example, FIG. 23 to FIG. 25 illustrate a leading-edge repair that utilizes a replacement piece 250 (shown in FIG. 24 and FIG. 25 and sometimes referred to as a replacement piece) that includes a curved interface surface 255 as compared to the more rectangular or linear interface surface of FIG. 2 to FIG. 4.

Figure 23:
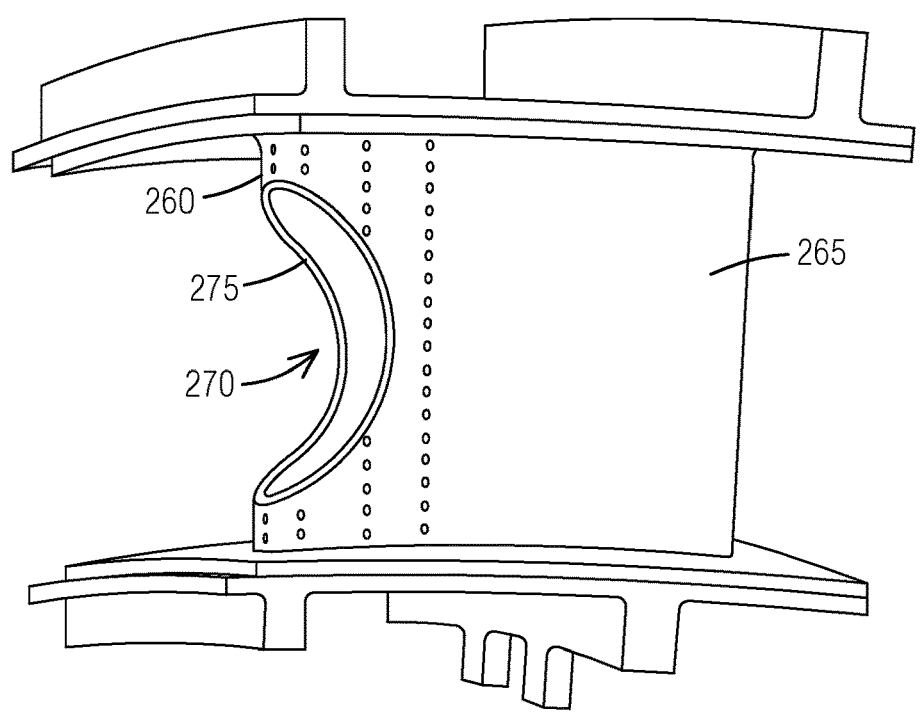
FIG. 23 is a perspective view of a gas turbine vane with a damaged portion removed.
Figure 24:
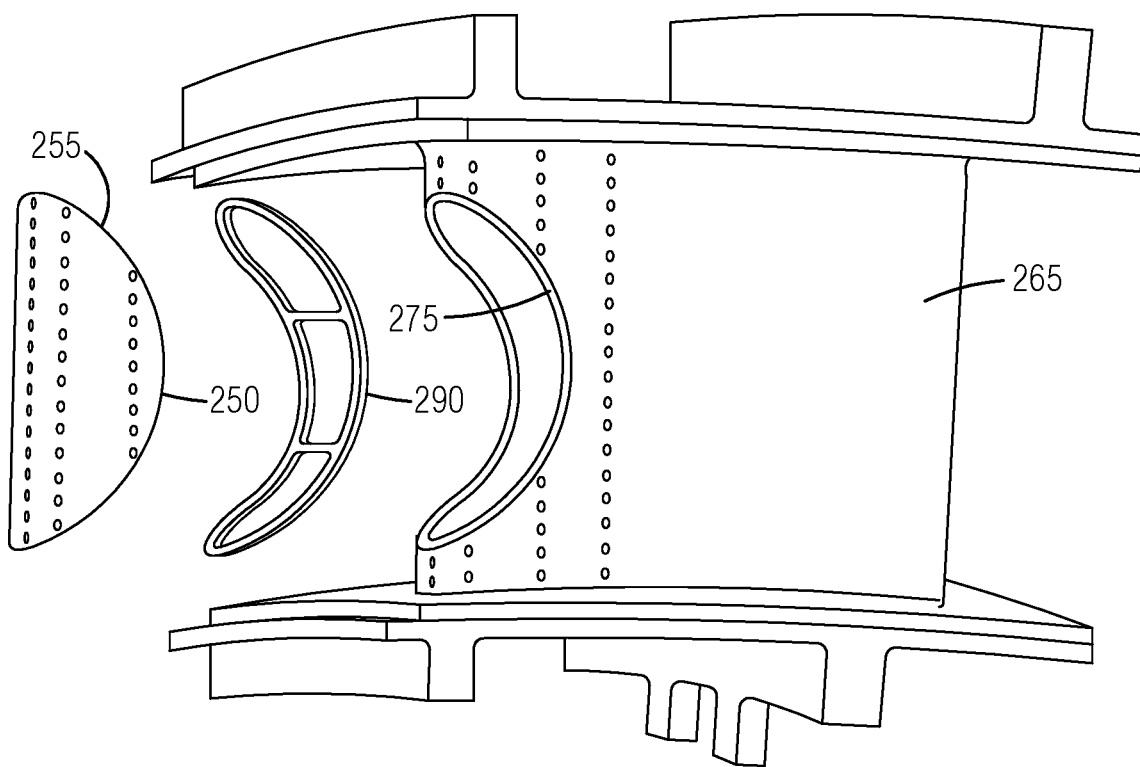
FIG. 24 is a perspective view of a pre-sintered preform (PSP) replacement piece and a PSP attachment piece sized to repair the damaged portion of FIG. 23.

Specifically, and with reference to FIG. 23, a leading-edge 260 of a stationary vane 265 is illustrated with a portion removed. The removed portion 270 likely included damage such as cracks, spallation, impact damage, and the like that rendered it unsuitable for use. The damaged material, along with undamaged material is removed to define a vane interface 275 that is curved. The vane interface 275 could follow an elliptical or circular arc (when viewed in the circumferential direction) or any other curve desired. It is preferred that a continuous curve (when viewed in the circumferential direction), in the mathematical sense be employed but non-continuous curves or surfaces could be employed as well. The stationary vane 265 of FIG. 23 includes a pressure side surface and a suction side surface spaced from the pressure side surface to define a hollow space. In this arrangement, a first interface surface is formed on the pressure side surface and a second interface surface is formed on the suction side surface. In preferred constructions, each of the first interface surface and the second interface surface follows the same continuous curve (when viewed in the circumferential direction). However, some constructions may employ different curves. In addition, as will be understood, the interface surfaces follow a complex three-dimensional path. However, when that path is projected onto a plane in the circumferential direction, that curve is preferably a continuous curve.

With the damaged portion removed, the replacement piece 250 can be manufactured. The replacement piece 250 could be manufactured using any of the various processes described herein and is manufactured to include the replacement surface 255 that is curved to closely match the vane surface 275 formed in the vane 265 through the removal of the damaged portion 270. In addition, any cooling holes 285 or other internal features (e.g., ribs, etc.) are typically preformed in the replacement piece 250 before it is attached to the vane 265.

Figure 25:
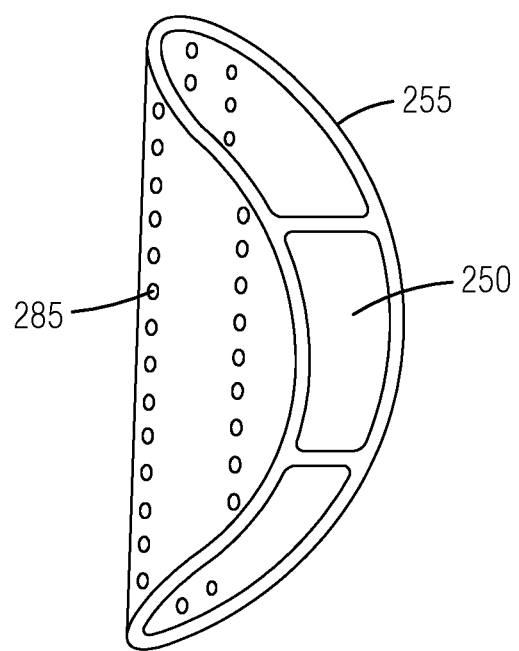
FIG. 25 is a perspective view of the pre-sintered preform (PSP) replacement piece of FIG. 24.

The replacement surface 255 illustrated in FIG. 25 includes a third interface surface and a fourth interface surface that are each curved to match the curves of the first interface surface and the second interface surface. Specifically, in preferred constructions, the third interface surface and the fourth interface surface define a continuous curve when projected in the circumferential direction onto a two-dimensional plane. Of course, the actual shape of the curve or curves is selected to match the first interface surface and the second interface surface.

As illustrated in FIG. 24, a PSP interface component 290 may also be manufactured to closely match the shape of the replacement surface 255 and the vane interface surface 275. PSP interface components 290 are used to enhance the attachment of the replacement piece 250 to the vane 265 when material considerations or other considerations make it necessary. Of course, in some constructions, the PSP interface component 290 is not needed.

The replacement piece 250, and the PSP interface component 290, if needed are positioned as illustrated in FIG. 24 such that they closely fit one another. A braze process is then performed using any of the braze materials discussed herein or any other braze material suitable for use with the particular materials of the vane 265 and the replacement piece 250 and the process in which the vane 265 ultimately operates. Once the braze is complete, the repaired vane 265, or other component can be finished with any processes that might be necessary for the particular component (e.g., machining, grinding, polishing, coating application, etc.).

As will be described below, these processes and procedures can be applied to other components such as a tip 120 of the vane 30 or blade or some other component.

For example, FIG. 15 to FIG. 19 illustrate a process similar to that just described but for the repair of the tip 120 of a nickel-based gas turbine vane 30 or blade, and specifically a vane 30 or blade made from Alloy 247 or a similar material.

Figure 15:
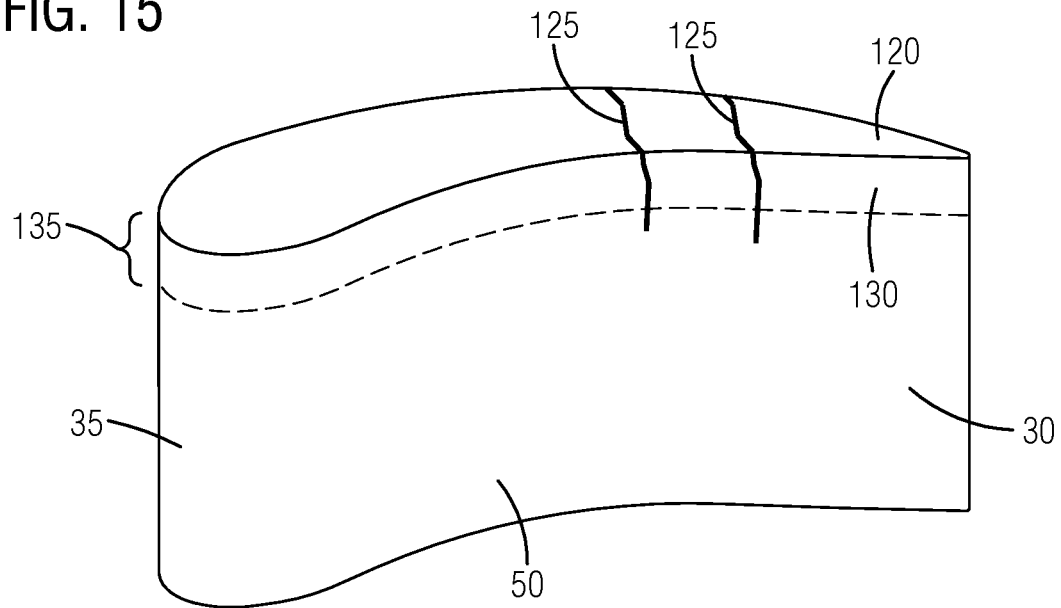
FIG. 15 is a perspective view of a portion of a gas turbine blade having operating damage in the form of tip corrosion and tip cracking.
Figure 16:
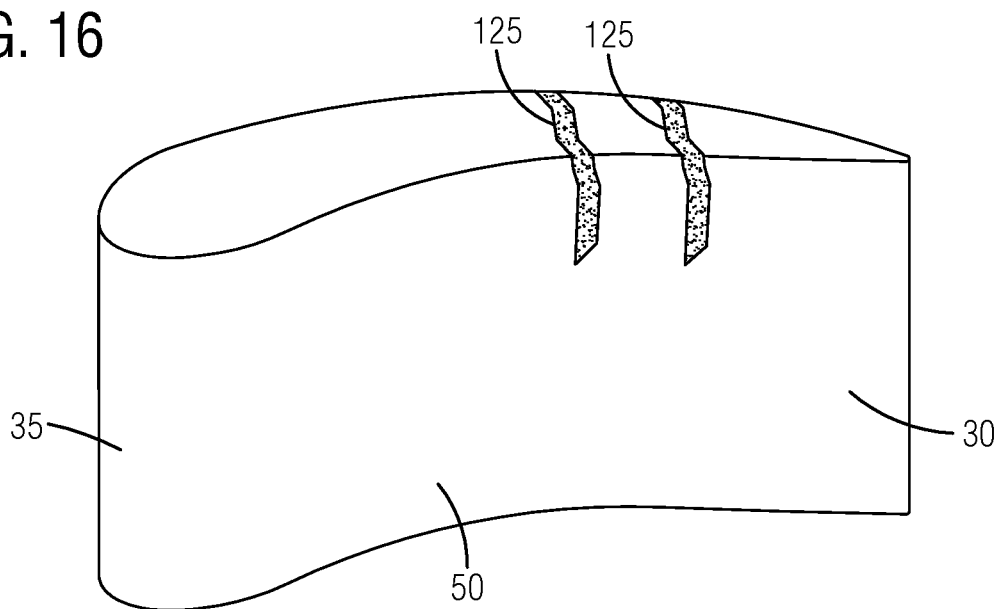
FIG. 16 is a perspective view of the blade of FIG. 15 with the damaged portion of the blade removed.

FIG. 15 schematically illustrates the blade 30 with tip section cracks 125 that extend downward in the blade 30. The blade tip 120 also includes oxidation damaged portions 130 that can be common following operation of the turbine blade 30. In order to repair the blade 30, the damaged portion of the tip 120 is first removed. In the example of FIG. 15, the removal of the damaged portion 135 does not completely remove the cracks 125 but does remove the oxidation damaged portions 130. It is desirable to minimize the amount of the tip 120 being removed such that in some circumstances, portions of the crack or cracks 125 may remain after removal. With reference to FIG. 16, any cracks 125 that remain after the removal of the damaged portion 135 are removed using a machining process, grinding, or other suitable material removal processes.

A closely fitting replacement tip 140 is formed to fill the space created by the removal of the damaged portion 135. The replacement tip 140 may also fill any spaces created during the removal of any cracks 125. Alternatively, the space opened during the removal of the cracks 125 can be filled with a powdered braze material during the attachment process for the replacement tip 140. The replacement tip 140 can be formed using an additive manufacturing (AM) process or can be formed from a pre-sintered preform (PSP) that provides similar or better oxidation and rupture properties than the removed portion 135.

Figure 17:
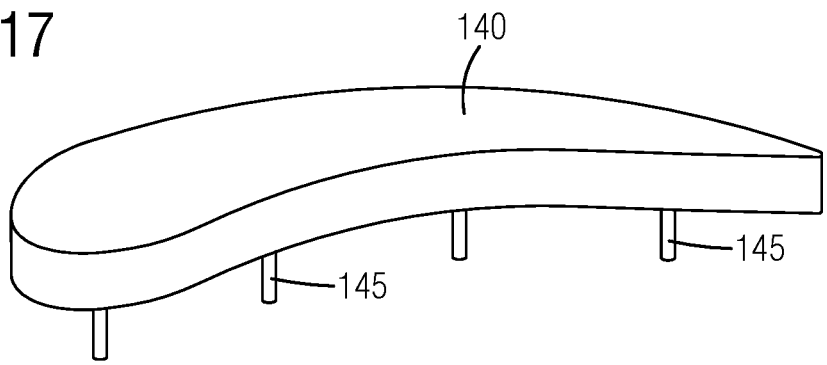
FIG. 17 is a perspective view of a replacement tip for the repair of the damaged blade of FIG. 16.

The replacement tip 140, when manufactured using an AM process is preferably composed of a material similar to the base material of the blade 30 with the addition of up to eight percent (8%) aluminum to provide superior oxidation resistance. In addition, attachment structures 110 such as pins 145, illustrated in FIG. 17, can be used to enhance the mechanical connection between the replacement tip 140 and the remainder of the blade 30 being repaired. Of course, other features such as protrusions, apertures, bosses, etc. can be used as attachment structures 110. The pins 145 of FIG. 17 are received in corresponding apertures formed or otherwise existing in the remaining portion of the blade 30 being repaired.

In constructions in which a PSP is used in place of an AM replacement tip 140, the material is preferably made of up to eighty percent (80%) superalloy (matching the base material of the blade 30 being repaired), up to eight percent (8%) aluminum, and up to thirty percent (30%) braze material including Ti, Zr, and Hf as described above.

The material used to manufacture the PSP replacement tip 140 is maintained at a temperature at least 50 degrees C. above the melting temperature of the braze material for more than one hour to react a majority of the braze material with the base material powder. This prevents re-melting during the braze operation that attaches the replacement tip 140 to the blade 30 being repaired.

Figure 18:
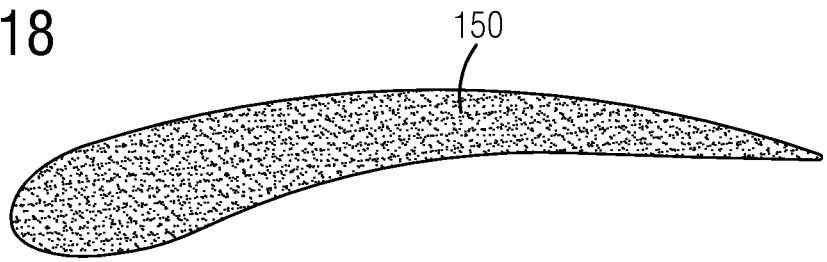
FIG. 18 is a perspective view of an attachment PSP for use in repairing the blade tip of FIG. 16.
Figure 19:
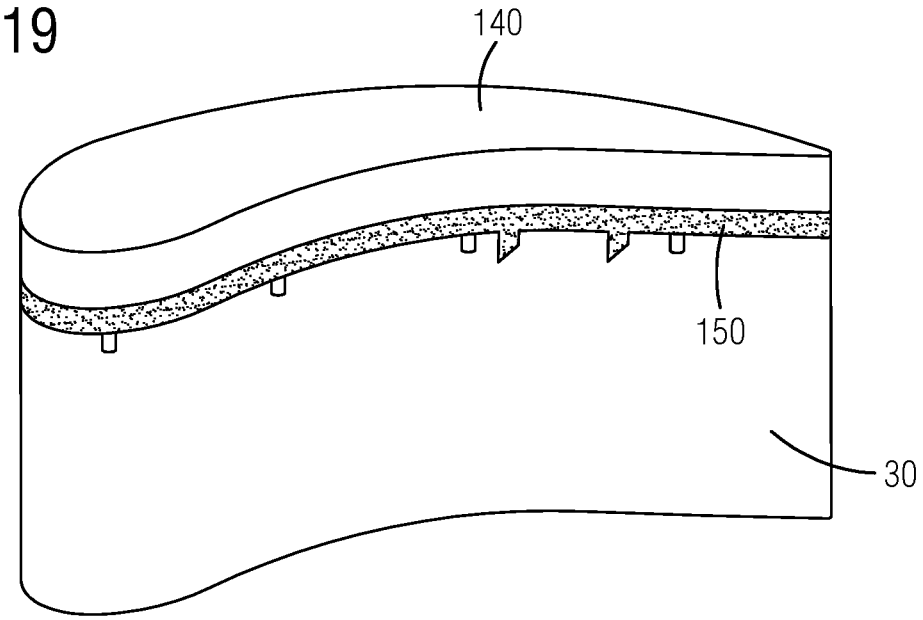
FIG. 19 is a perspective view of the damaged blade of FIG. 16, the attachment PSP of FIG. 18, and the replacement tip of FIG. 17.

A tip attachment PSP 150, shown in FIG. 18 is formed from a material combination similar to that described above with regard to the PSP replacement tip 140 with the exception that it includes at least thirty percent (30%) braze material rather than up to thirty percent (30%) braze material. The tip attachment PSP 150 is preferably no more than 250 microns thick and is produced at a similar temperature as the PSP replacement tip 140 described above but is held at temperature for a shorter period of time (less than 15 minutes). The tip attachment PSP 150 therefore has enough unreacted braze material to be able to join the replacement tip 140 to the blade 30 being repaired as illustrated in FIG. 19, regardless of how the replacement tip 140 is manufactured (PSP or additive manufacturing).

The replacement tip 140 has sufficient mechanical properties and oxidation resistance due to the adjusted composition and the Ni—Cr—(Ti, Zr, Hf) braze composition.

As discussed earlier, gas turbine components operate under a variety of localized conditions that can produce localized damage. This can be attributed to varied component conditions (e.g., temperatures, pressures, fluid properties, etc.) and engine conditions.

Figure 22:
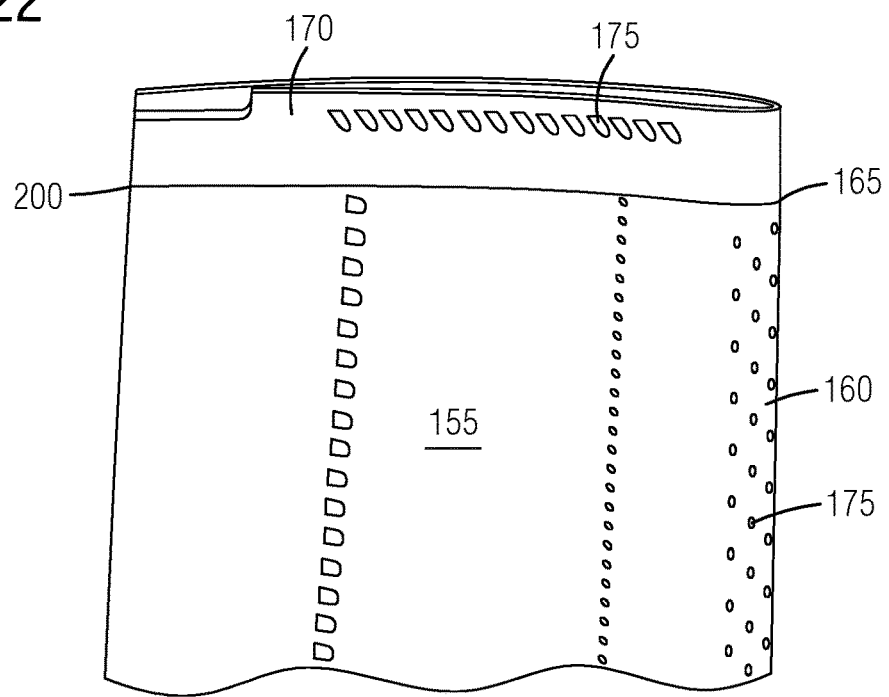
FIG. 22 is a perspective view of the replacement tip of FIG. 21 installed onto the blade of FIG. 16.

One example of localized operating conditions exists at the row one turbine blade 155 where localized distress on the blades 155 can cause damage in multiple areas including a leading edge 160 of the blade 155 and a tip 165 of the blade 155. FIG. 22 illustrates the leading edge 160 and the tip 165 of the blade 155 and also illustrates a replacement tip 170 installed to repair cracking and/or oxidation damage at the blade tip 165.

One type of damage occurs at the leading edge 160 of the first stage blade 155, as well as other blades where the ceramic coating adheres adjacent a series of cooling apertures 175. If the coating spalls, a leading edge burn out or loss is often observed. The other area where damage can occur is at the tip 165 of the blade 155 where the blade 155 can rub against a ring segment or other component radially outward of the blade 155. Heavy oxidation can also occur at the tip 165 of the blade 155 and cracks or tip cracks can form and propagate from cooling apertures 175 or from damage caused by other factors such as rubbing or oxidation.

As discussed previously, repairs to blade or vane tips 165 can include the removal of a portion of the blade tip 165 followed by replacement with a replacement tip 170. Similar repairs can also be made to blade or vane leading edges 160.

Additive manufacturing can be relied upon to manufacture replacement components or replacement tips 170 with brazing processes and special braze materials enhancing the operation of the repaired vane or blade 155.

Figure 20:
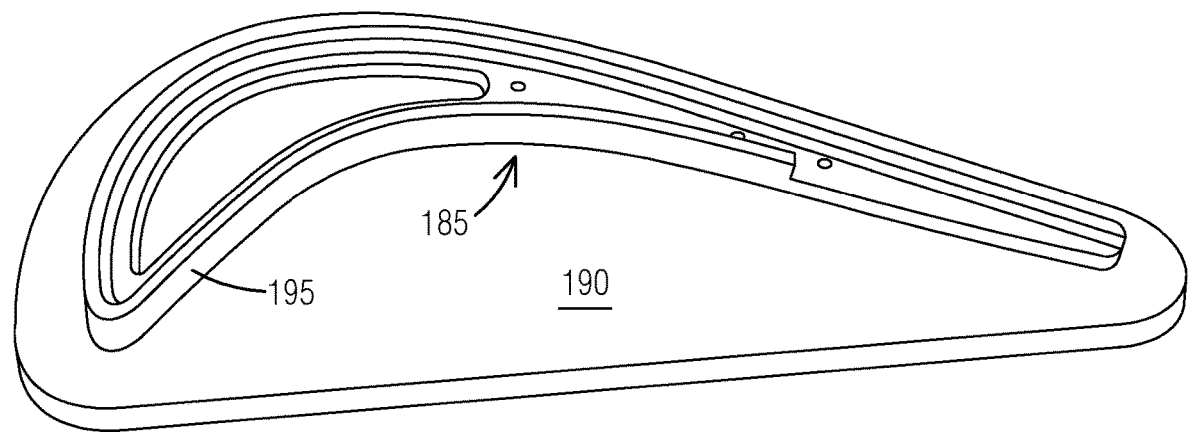
FIG. 20 is a perspective view of replacement tip in a "green-form" during the manufacturing process.
Figure 21:
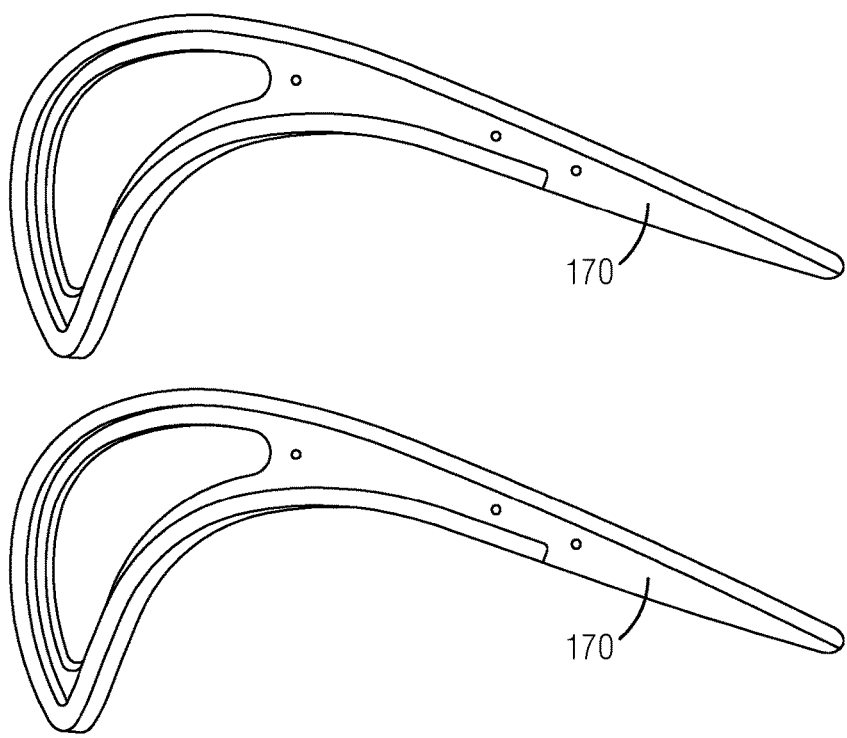
FIG. 21 is a perspective view of the replacement tip of FIG. 20 after sintering and removal from the manufacturing support member.

One preferred additive manufacturing process well-suited to manufacturing replacement components or replacement tips 170 includes atomic diffusion. FIG. 20 to FIG. 22 illustrate the process of repairing the blade tip 165 using atomic diffusion to form the replacement tip 170. As one of ordinary skill will realize, the same process could be applied to the repair of the leading edge 160 of the blade 155 or vane as well as to other components not discussed herein.

With reference to FIG. 20, atomic diffusion uses binding agents and a metal powder for rapid construction of a 3D shape. The metal powder is generally selected to closely match the material (e.g., Alloy (CM) 247) used in the component (i.e., the blade 155) being repaired. The metal powder and the polymeric binding agent are mixed and then formed into the desired shape that will ultimately result in the replacement component or tip 170. This preliminary component 185 is often referred to as a "green-form". The "green-form" component 185 is then heated and sintered in a high temperature sintering operation to remove the binding agent and mechanically/metallurgically bond the powder particles. The sintering temperature is selected to fully remove the binding agent while providing the desired mechanical/metallurgical bond of the powdered metal without fully melting the powdered metal particles.

One method of forming the green-form component 185 includes a 3-D printing technique. A wire feedstock is prepared including the desired powder metal and the binder. The user is able to combine material chemistries or tailor chemistries as desired to achieve the desired material properties in the completed replacement tip 170 or replacement piece. In addition, different compositions can be used at different times during the forming of the replacement tip 170 to achieve different properties at the different locations within the replacement tip 170. For example, in one construction a composition intended to be a first or interfacing layer includes the desired base materials as well as braze material integrated into the wire feedstock.

To manufacture the replacement tip 170 or another component, the first or interfacing layer is deposited onto a support structure 190 or is formed independent of the support structure 190. The first surface in the example of FIG. 20 is intended to be the surface that interfaces or is brazed to the component being repaired (i.e., the blade 155) to attach the replacement tip 170 to the blade 155 being repaired. Additional layers may be formed on top of the first layer using the same material, or another material may be used as may be required for the particular replacement component.

For example, the feedstock could be changed to a second material that does not include the braze material and rather, more closely matches the base material of the blade 155 or other component being repaired. As discussed above, some materials could be employed that enhance the performance of the replacement tip 170 or other component over that of the base material. Any of those materials could be employed in this process as well. For example, up to 8% aluminum could be employed to enhance oxidation resistance. As previously noted, the sintering process is designed to not melt the powdered material. Because the process is a non-melting process, no variation in chemistry is expected.

With continued reference to FIG. 20, the metal powder is extruded with the binder (e.g., a polymer) to create the wire feedstock that is then deposited onto the support structure 190. A ceramic interlayer 195 may be positioned between the deposited material and the support structure 190 to aid in the removal of the completed replacement tip 170 from the support structure 190. A washing step of the green structure removes the polymer binder and densification is performed via sintering. Typically, densities of greater than ninety-six percent can be achieved but this is dependent on component size and corresponding wall thickness, since the densification is achieved by solid stage diffusion. Examples of replacement tips 170 formed using this process, after sintering and removed from the support structure are illustrated in FIG. 21.

This method does not experience the isotropy of layer-based AM techniques and because of its speed in producing the green-form component 185 and very low powder waste, reduces cost significantly over other AM techniques. In addition, as noted earlier this process of additive manufacturing can be used to form components other than replacement tips 170, including leading edge replacements or other components and can include advanced features such as attachment structures 110.

Another benefit with this approach is that the components can be made from other high temperature resistant materials (e.g., oxide dispersion strengthened (ODS) or advanced single crystal (CMSX8/Rene N5/PWA1484)) that have better strength, oxidation resistance, and coating adhesion.

In summary, FIG. 20 to FIG. 22 illustrate a replacement tip 170 during various states of manufacture using the atomic diffusion process. After removal of the damaged portion of the tip 165 of the blade 155 being repaired, the replacement tip 170 can be sized for manufacture. In many cases, the support structure 190 will be needed to define a base of support onto which the replacement tip 170 can be formed. While not required, in situations where the support structure 190 is used, a ceramic interlayer 195 may be first applied to aid in easily separating the completed replacement tip 170 from the support structure 190.

The green-form component 185 is next printed using feedstock of the appropriate makeup. The first layer, or the first few layers may use a feedstock that is part base material, part binder, and part braze material that ultimately is used during the attachment of the replacement tip 170 to the blade 155. After these initial layers are printed, the feedstock may be switched to a feedstock that includes the desired base metal chemistry (i.e., a chemistry closely matching the blade 155) and a binder, often in the form of a polymer. The chemistry of the subsequent feedstock may include an enhanced chemical make-up as discussed earlier to provide superior material properties such as oxidation resistance.

Upon completion of the 3-D printing process, the green-form component 185 is washed and sintered to remove the binder and to mechanically or metallurgically bond the remaining particles in the desired shape. The sintered replacement tip 170 is removed from the support structure 190 as illustrated in FIG. 21.

As illustrated in FIG. 22, the replacement tip 170 is placed in position on the blade 155 and a braze joint 200 is formed therebetween. During the brazing process, braze material in the initial layer or layers of the replacement tip 170 facilitates the completion of the braze joint and the attachment of the replacement tip 170.

Current materials used for pre-sintered preforms (PSPs) and for brazing materials for use with nickel-based super alloy materials that operate in high temperature environments (e.g., 1000 degrees F., 538 degrees C.) are typically nickel (Ni) chromium (Cr) based.

The composition described herein is preferably applied to PSPs and/or braze materials that do not include boron. To improve the creep rupture life of boron-free PSPs and braze materials, rhenium (Re) or Ruthenium (Ru) can be added to most nickel-based braze alloys. These two elements are potent creep resistance elevators that are added to base metal composition for creep-rupture life improvement. They increase the creep resistance of nickel-base alloys by up to a factor of ten. Their high melting point and large atomic diameter results in low atomic diffusion rates and enables Ni base materials to increase their creep resistance.

Rhenium (Re) and Ruthenium (Ru) have not been added to boron-free braze materials to date as the need for creep resistance braze materials was not known.

To add Re or Ru, the materials are powdered and then mixed with a base material powder mixture prior to brazing. Re and Ru are added to boron free Ni—Cr—X braze/base material powder mixture prior to PSP making. Preferably, the Re and Ru have the smallest particle size possible for the powder. It is preferred that Re and Ru powder diameter is at least 50% or smaller than the base metal and braze metal powder to assure uniform mixing and homogeneous elemental distribution after brazing. Re and Ru powders are not melted during the brazing process. Rather they diffuse into the surrounding liquid braze material during braze. Since diffusion rates are high in liquid, these elements are transported uniformly within the braze material.

Re and Ru are added such that they make up 3-6 percent of the total composition of the braze or PSP regardless of the proportion of base metal to braze powder in the braze.

For example, the repair of a component manufactured from Alloy 247 may employ a PSP that is manufactured from powders in which 74-77 percent matches the Alloy 247 composition, 20 percent matches a desired braze material (sometimes referred to as a melting point depressant), and 3-6 percent is one or both of Re or Ru.

Suitable braze materials are typically nickel-based and include nickel, chromium, and at least one of titanium, zirconium, and hafnium. Some specific braze compositions include a composition that includes 6.5% Cr, 11% Zr, 7.5% Ti, and the remainder Ni. Another composition could include 5.0% Cr, 10% Hf, 10% Zr, and the remainder Ni. Yet another composition could include 17% Cr, 22% Ti, and the remainder Ni.

Each of the three components, the base material (74-77 percent), the braze material (20 percent), and the Re or Ru (3-6 percent) are powdered and mixed together for sintering. During any melting steps (i.e., brazing processes), the Re and Ru are not melted. Rather, they disperse through any melt pools during the melting process.

FIG. 3 illustrates one possible PSP insert 60 that could be manufactured using the above-described materials. The PSP insert 60 is preformed and sintered to include base material, a braze material, and the desired quantity of Re or Ru. FIG. 4 illustrates the repair of a turbine vane 30 using the PSP insert 60 illustrated in FIG. 3. After the damaged portion of the vane 30 is removed, the required PSP insert 60 is sized and manufactured as described. The PSP insert 60 is then positioned in the empty space 55 in the vane 30 and brazed into place. During the brazing process, some of the Re and Ru will migrate into the liquid braze. The Re and Ru will not melt in the pool but rather will become embedded in the braze material during solidification.

Figure 26:
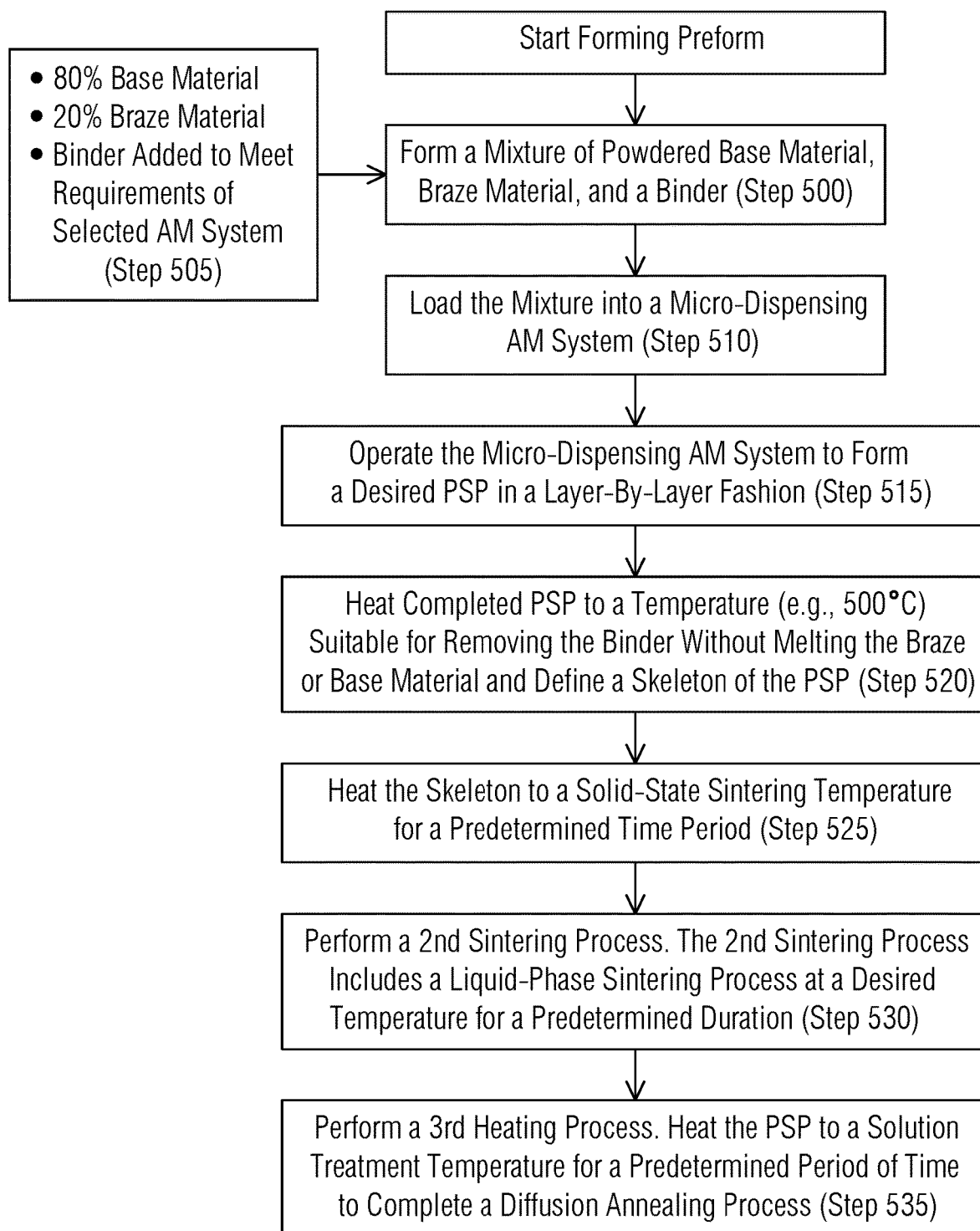
FIG. 26 is a flowchart illustrating one process for forming a PSP.

Nickel-based superalloys that include more than about two percent aluminum are known to be particularly difficult to weld or to form using present additive manufacturing techniques. Components, parts of components, or preforms using these materials can be manufactured using a process similar to that described above. In one example, a preform (e.g., preforms 105, 250, etc.) with a nickel-based superalloy that may include at least 4.5 percent aluminum is formed. Of course, the system and process can be used with virtually any desired material. In one process, illustrated in FIG. 26 a pre-sintered preformed (PSP), such as the one illustrated in FIG. 23 to FIG. 25 is formed for the repair or the manufacture of a component having a base material that is a nickel-based superalloy with more than 4.5% percent aluminum. To form the PSP a mixture of powdered base material, a braze material, and a binder is made (step 500). For gas turbine applications, a mixture of 80 percent base material and 20 percent braze material is suitable, with binder added as required to meet the requirements of the additive manufacturing process being employed (step 505). The mixture is made to be suitable for use in a micro-dispensing additive manufacturing system such as those used and sold by ηSCRYPT of Orlando Florida (step 510). Micro-dispensing AM systems can dispense the mixture in layers that are as thin as 10 microns and as thick as 100 microns with preferred thicknesses being 20 microns to 50 microns.

The micro-dispensing AM system is then operated to dispense the mixture in a series of layers that define the desired shape of the PSP (step 515) (e.g., replacement piece 250, PSP interface component 290, etc.). Preferably, each layer is between 20 microns and 100 microns in thickness with other thicknesses being possible. The use of the micro-dispensing AM system allows for very fine control including the use of a CNC model to drive the positioning of the layers to improve the accuracy and finish of the final component.

Once the micro-dispensing AM process is completed, the component is removed from the device and is heated to a temperature less than 500 degrees C. but hot enough to remove the binder from the component (step 520). At the completion of this process, a component skeleton is formed that includes base material and braze material in the ratio selected for the mixture and gaps where the binder material was prior to its removal in the first heating process.

The component skeleton is then heated to a solid-state sintering temperature that for this material falls within the range of 1000 degrees C. to 1250 degrees C. (step 525). Typically, the solid-state sintering process requires less than 60 minutes to complete. Of course, other materials or mixtures having different ratios of the base material and braze material may have different solid-state sintering temperatures and may require more time to complete the solid-state sintering.

A second sintering process is then performed on the now sintered component skeleton (step 530). Specifically, the component is heated to a braze temperature range of between 1250 degrees C. and 1300 degrees C. for less than 60 minutes to melt all or some of the braze material, but not the base material, thereby completing a liquid-phase sintering process. Of course, other materials or mixtures having different ratios of the base material and braze material may have different liquid-phase sintering temperatures and may require more time to complete the solid-state sintering.

To complete the formation of the skeleton component, the skeleton component is again heated to a solution treatment temperature range of between 1230 degrees C. and 1300 degrees C. for between 1 and 12 hours to complete a diffusion annealing process (step 535). Of course, other materials or mixtures having different ratios of the base material and braze material may have different diffusion annealing temperatures and may require more time to complete the diffusion annealing process.

Following these steps allows for the sintering of the component without melting and solidifying the base material (high gamma prime powder) such that the component is not prone to cracking.

Figure 27:
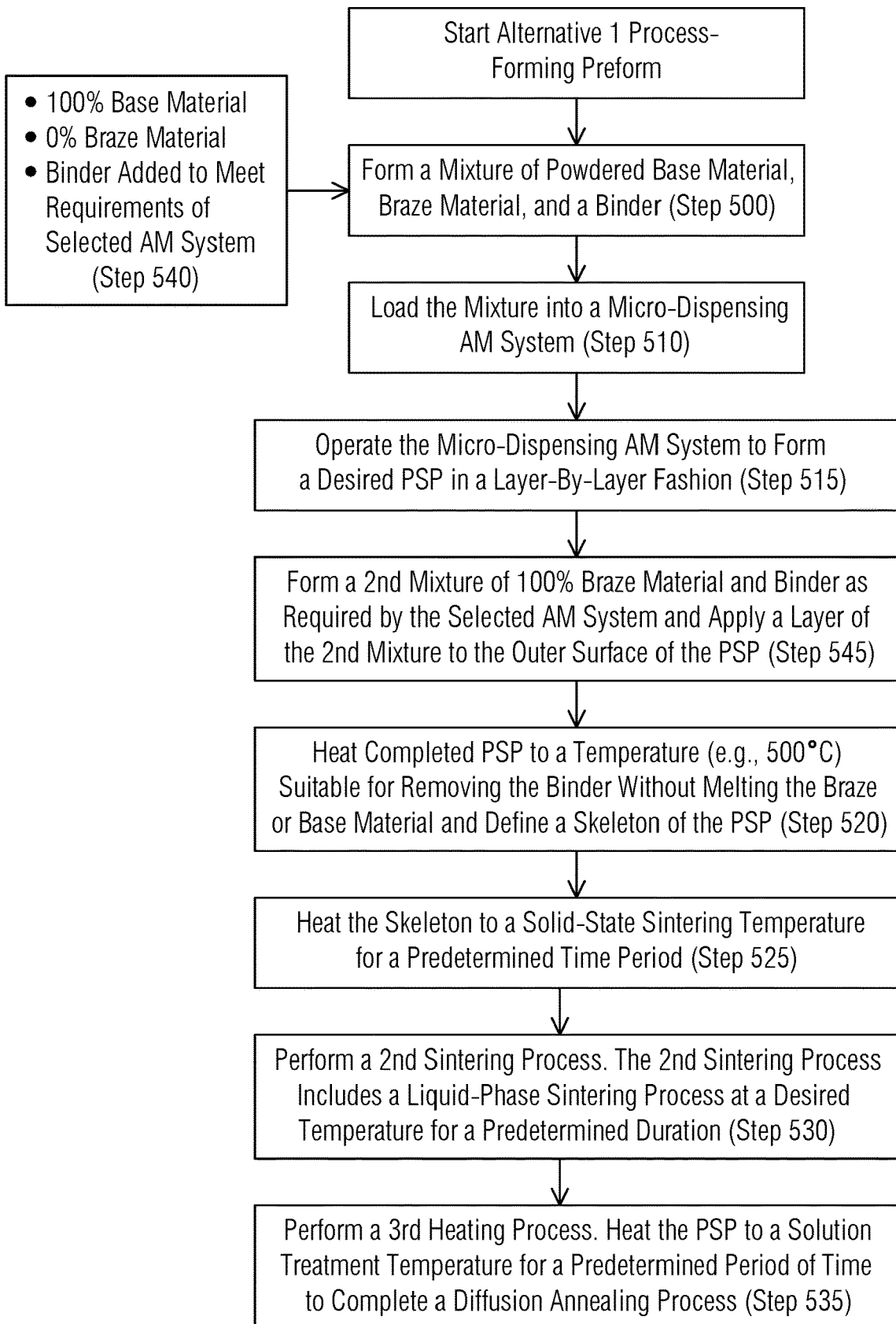
FIG. 27 is a flowchart illustrating an alternative process for forming a PSP.

One variation of the process just described, illustrated in FIG. 27 utilizes a mixture of base material and binder with no braze material (step 540). The component is 3d printed using the micro-dispensing AM process described above. A second mixture containing a braze and binder mixture is then applied to some or all the outer surfaces of the completed component using the micro-dispensing AM process or another process if desired (step 545). The various heating processes described above are then performed. During the liquid-phase sintering process, the braze melts and infiltrates the base metal powder of the component.

In another variation, of the just-described process, the component is covered or partially covered with either a 100 percent braze material binder mixture or a base material powder, a braze material powder, and a binder mixture. The sintered skeleton is ultimately infiltrated by the braze to obtain a near 100 percent dense component.

In all the processes just described, the braze material is preferably one of a Ni—Cr—Ti or a Ni—Cr—Ti—Zr braze. In addition, the aforementioned processes generally allow for the avoidance of a HIP (Hot Isostatic Pressing) operation as the liquid phase infiltration results in a near 100 percent dense structure (typically at least 99.9 percent).

As discussed, the above processes can be used to form components using high gamma prime powder which does not melt in this process such that residual stresses that cause cracking and may be created during solidification are not present.

The micro-dispensing AM process can produce layers having thicknesses as low as 10 microns. In addition, PSP components or panels can be built and used to join nickel and cobalt base alloys including Ni—Cr—Ti and Ni—Cr—Ti—Zr. In addition, these materials and the micro-dispensing AM process can be used to produce foils having a total thickness of 50 microns or less (e.g., PSP interface component 290). In addition, the micro-dispensing AM process allows for the production of near net shape components using high gamma prime materials without cracking. While an 80/20 (base material/braze material) powder mix is preferred for gas turbine applications, some applications may include up to 30 percent braze material.

It should be noted that while the foregoing examples describe the formation of PSP components separate from the components being repaired, some repairs may include printing the PSP preform directly onto the component being repaired. Thus, the invention should not be limited to PSPs that are formed separate from the component they are being made to repair.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A replacement assembly for replacing a damaged portion of a component, the replacement assembly comprising:
a replacement piece including a first plurality of layers with each layer of the first plurality of layers formed on top of a prior formed layer of the first plurality of layers, the first plurality of layers arranged to define a curved leading-edge portion and a first interface surface, the first interface surface defined by a first continuous curve, wherein each layer of the plurality of layers includes particles of a base material that are attached to one another via a sintering process such that the particles of base material are not melted, and wherein each layer of the first plurality of layers defines a thickness of between 10 microns and 100 microns; and
an attachment piece including a second plurality of layers with each layer of the second plurality of layers formed on top of a prior formed layer of the second plurality of layers, the attachment piece arranged to fit between the first interface surface and the component to fixedly attach the replacement piece to the component to replace the damaged portion of a component.

2. The replacement assembly of claim 1, wherein each layer of the second plurality of layers defines a thickness of between 10 microns and 100 microns.

3. The replacement assembly of claim 1, wherein the replacement piece includes a first wall that defines the first interface surface and a second wall spaced apart from the first wall that defines a second interface surface defined by a second continuous curve.

4. The replacement assembly of claim 3, wherein the first continuous curve and the second continuous curve are the same.

5. The replacement assembly of claim 3, wherein the first continuous curve and the second continuous curve cooperate to form one continuous and closed curve.

6. The replacement assembly of claim 5, wherein the one continuous and closed curve is part of a surface, and wherein the surface is the sole contact surface between the replacement piece and the attachment piece.

7. The replacement assembly of claim 1, wherein the replacement piece is a portion of a leading edge of a turbine vane.

8. The replacement assembly of claim 7, wherein the turbine vane and the replacement piece cooperate to enclose a hollow space within the turbine vane.

9. The replacement assembly of claim 1, wherein the second plurality of layers cooperate to define an attachment piece thickness, and wherein that thickness is less than 50 microns.

10. The replacement assembly of claim 1, wherein the replacement piece includes a nickel-based superalloy that includes more than two percent aluminum.

11. The replacement assembly of claim 1, wherein the replacement piece is formed using a micro-dispensing AM process.

12. The replacement assembly of claim 11, wherein the replacement piece is formed from a material that defines a theoretical 100 percent density, and wherein the replacement piece has an actual density between 99 and 100 percent of the theoretical density.

13. The replacement assembly of claim 1, wherein the attachment piece is formed using a micro-dispensing AM process.

14. The replacement assembly of claim 13, wherein the attachment piece is formed from a material that defines a theoretical 100 percent density, and wherein the attachment piece has an actual density between 99 and 100 percent of the theoretical density.

15. The replacement assembly of claim 1, wherein the replacement piece defines a wall and includes a plurality of apertures that pass through the wall.

* * * * *